(12) United States Patent
Nagao (10) Patent No.: US 9,551,855 B2
(45) Date of Patent: Jan. 24, 2017

(54) LENS BARREL AND OPTICAL APPARATUS

(71) Applicant: CANON KABUSHIKI KAISHA, Tokyo (JP)

(72) Inventor: Yuki Nagao, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/851,517

(22) Filed: Sep. 11, 2015

(65) Prior Publication Data

US 2016/0077304 A1    Mar. 17, 2016

(30) Foreign Application Priority Data

Sep. 17, 2014 (JP) ................. 2014-188902

(51) Int. Cl.
*G02B 15/14* (2006.01)
*G02B 7/10* (2006.01)

(52) U.S. Cl.
CPC .................... *G02B 7/102* (2013.01)

(58) Field of Classification Search
CPC .................... G02B 7/102
USPC ..................... 359/700
See application file for complete search history.

(56) References Cited

U.S. PATENT DOCUMENTS

2006/0181783 A1* 8/2006 Masuki ............ H04N 5/2254
                                                    359/700
2010/0128365 A1* 5/2010 Li .................... G02B 7/102
                                                    359/694

FOREIGN PATENT DOCUMENTS

JP           2000002830 A        1/2000

* cited by examiner

*Primary Examiner* — James Jones
(74) *Attorney, Agent, or Firm* — Rossi, Kimms & McDowell LLP (57) ABSTRACT

The lens barrel includes a base barrel, a movable barrel including first and second hole portions, a circumferentially rotatable barrel and first guide members. The base barrel includes straight guide portions guiding the movable barrel along an optical axis, the rotatable barrel includes cam portions moving the movable barrel with rotation of the rotatable barrel, the first guide members engage with the cam and straight guide portions. The cam portions, straight guide portions and first guide members are respectively provided at multiple circumferential phases, a guide member among the first guide members provided at a first phase engages with the first hole portion, each of other guide members among the first guide members provided at two or more second phases engages with each of the second hole portions. A circumferential width of each second hole portion is larger than that of the first hole portion.

10 Claims, 5 Drawing Sheets

LENS BARREL AND OPTICAL APPARATUS

BACKGROUND OF THE INVENTION

Field of the Invention

The present invention relates to a lens barrel to be used for optical apparatuses such as digital cameras, video cameras and interchangeable lenses.

Description of the Related Art

The above-described lens barrel includes ones having a mechanism which moves, by utilizing rotation of a rotatable barrel rotatable about an optical axis in a circumferential direction, a holder that holds an optical element such as a lens (the holder is hereinafter referred to as "a lens-holding frame") in an optical axis direction for focusing and zooming. Such a mechanism typically uses a cam barrel as the rotatable barrel having a cam portion, a guide barrel as a base barrel having a straight guide portion extending in the optical axis direction and a cam follower engaged with both the cam portion and the straight guide portion. The cam follower is fixed to a lens-holding frame by a fastening member such as a screw. Rotation of the cam barrel in a circumferential direction causes the cam follower to be driven by the cam portion in the optical axis direction while being guided by the straight guide portion in the optical axis direction, which moves the lens-holding frame in the optical axis direction.

In order to highly accurately move the lens-holding frame together with movement of the cam portion, it is important to stably fix the cam follower at a predetermined position on the lens-holding frame without a positional shift. It is thus desirable to attach the cam follower to the lens-holding frame with good accuracy and to engage the cam follower, the cam portion and the straight guide portion with one another without backlash.

In addition, it is necessary to prevent, even when environment such as temperature changes after assembling of the lens barrel, a decrease in optical performance caused by, for example, tilt of the lens-holding frame due to an increase in engagement backlash between the cam follower, the cam portion and the straight guide portion.

Japanese Patent Laid-Open No. 2000-002830 discloses a lens barrel in which one of a base barrel and a movable barrel is provided with, at its two mutually circumferentially adjacent phases, straight grooves each extending in an optical axis direction and respectively engaging with engagement members fixed to the other of the base barrel and a movable barrel, which prevents the movable barrel from tilting.

However, in the lens barrel disclosed in Japanese Patent Laid-Open No. 2000-002830, the movable barrel is moved in the optical axis direction by the engagement of the engagement members fixed to the base barrel with the straight grooves formed in the movable barrel and engagement of a drive pin provided to a rotatable focus ring with a lead groove formed in the movable barrel. The movable barrel is linearly moved in the optical axis direction without rotation in the circumferential direction. This configuration can prevent the movable barrel from tilting by the engagement members engaging with the straight grooves, but cannot prevent a positional accuracy of the movable barrel in the optical axis direction from being affected by dimensional tolerances of the engagement members and the drive pin because the engagement members engaging with the straight grooves and the drive pin are separately provided. Furthermore, presence of the dimensional tolerance or an assembling error of the engagement members engaging with the straight grooves generates twisting (prying, wrenching, galling) in movement of the movable barrel. The twisting increases a load, leading to a deterioration in operational feel of the focus ring.

SUMMARY OF THE INVENTION

The present invention provides a lens barrel resistant to environmental change and impact and capable of holding a movable barrel with good positional accuracy without deteriorating operational feel during movement of the movable barrel. The present invention further provides an optical apparatus including the lens barrel.

The present invention provides as an aspect thereof a lens barrel including a base barrel fixed in an optical axis direction and in a circumferential direction about an optical axis, a movable barrel movable with respect to the base barrel in the optical axis direction, the movable barrel including a first hole portion and a plurality of second hole portions, a rotatable barrel rotatable with respect to the base barrel and the movable barrel in the circumferential direction, and a plurality of first guide members. The base barrel includes a plurality of straight guide portions extending in the optical axis direction to guide the movable barrel in the optical axis direction, the rotatable barrel includes a plurality of cam portions to move the movable barrel in the optical axis direction with rotation of the rotatable barrel, the first guide members engage with the cam portions and the straight guide portions, the cam portions, the straight guide portions and the first guide members are respectively provided at multiple phases which are three or more phases in the circumferential direction, a guide member out of the first guide members provided at a first phase of the multiple phases engages with the first hole portion, each of other guide members out of the first guide members provided at two or more second phases of the multiple phases different from the first phase engages each of the second hole portions. A width of each of the second hole portions in the circumferential direction is larger than a width of the first hole portion in the circumferential direction in view of a direction perpendicular to the optical axis.

The present invention provides as another aspect thereof an optical apparatus including a lens, and the above lens barrel holding the lens.

The present invention provides as yet another aspect thereof a method of manufacturing a lens barrel including a base barrel fixed in an optical axis direction and in a circumferential direction about an optical axis, a movable barrel movable with respect to the base barrel in the optical axis direction, a rotatable barrel rotatable with respect to the base barrel and the movable barrel in the circumferential direction. The method includes the steps of inserting each of a plurality of first guide members to each of a plurality of cam portions provided at a multiple phases and included the rotatable barrel, and to each of a plurality of straight guide portions provided at the multiple phases and included in the base barrel, positioning a guide member out of the first guide members provided at a first phase of the multiple phases with respect to the movable barrel in the optical axis direction and in the circumferential direction by a first hole portion, positioning other guide members out of the first guide members provided at two or more second phase of the multiple phases different from the first phase with respect to the movable barrel in the optical axis direction by a plurality of second hole portions configured so that a width in the circumferential direction is larger than a width in the optical axis direction in view of a direction perpendicular to the optical axis.

Further features and aspects of the present invention will become apparent from the following description of exemplary embodiments with reference to the attached drawings.

DESCRIPTION OF THE EMBODIMENTS

An exemplary embodiment of the present invention will be described below with reference to the attached drawings.

Figure 1:
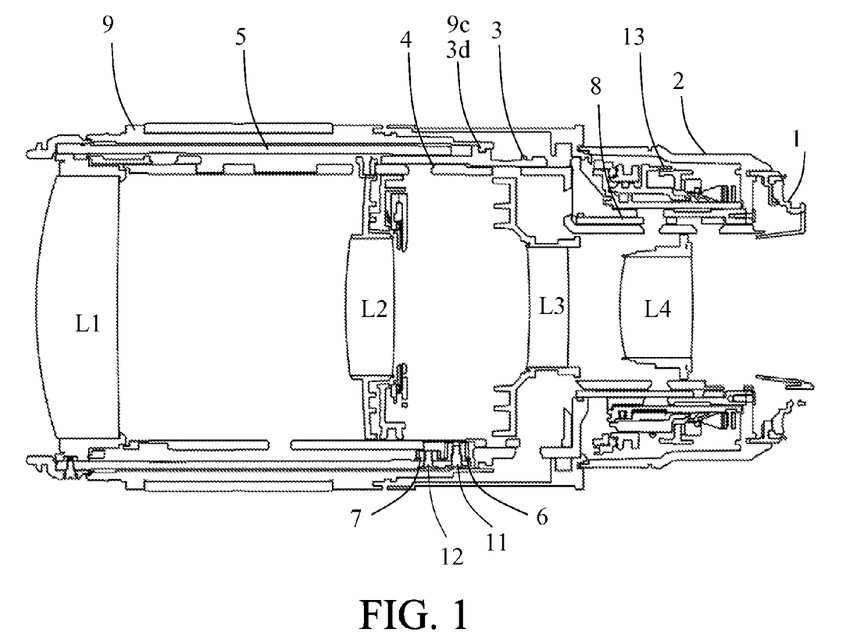
FIG. 1 is a sectional view illustrating a configuration of a lens barrel of an interchangeable lens that is an embodiment of the present invention.
Figure 2:
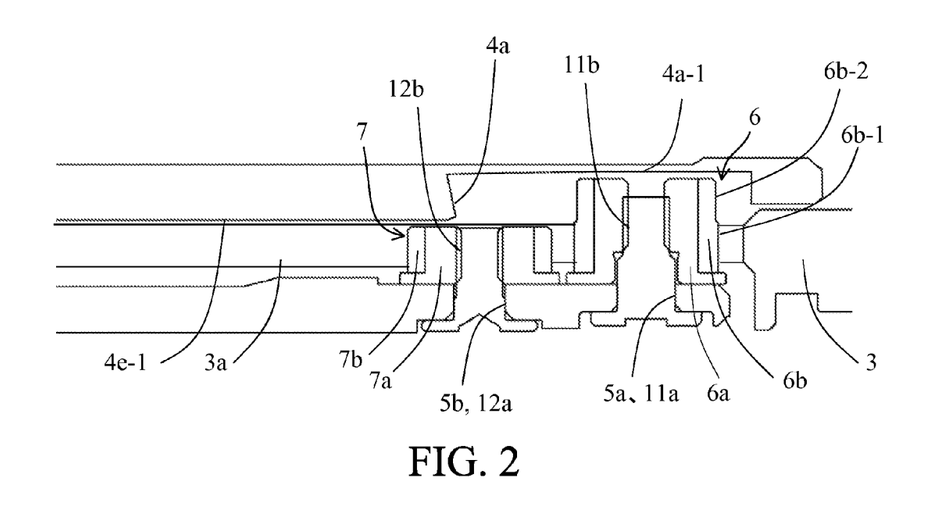
FIG. 2 is a partially enlarged view of the lens barrel illustrated in FIG. 1.

FIG. 1 illustrates a configuration of a lens barrel to be used for an interchangeable lens as an optical apparatus that is an embodiment of the present invention. FIG. 2 is a partially enlarged view of the configuration in FIG. 1. Although this embodiment will describe the interchangeable lens, the same configuration as that described in this embodiment or a modified configuration can be applied also to a lens barrel of a lens-integrated image capturing apparatus (optical apparatus) such as a digital camera and a video camera.

The lens barrel holds thereinside a first lens unit L1, a second lens unit L2, a third lens unit L3 and a fourth lens unit L4, which constitute an image capturing optical system. Each of the lens units L1 to L4 is constituted by at least one lens and a holder (lens-holding frame) holding the at least one lens. In the following description, a direction in which an optical axis of the image capturing optical system extends is referred to as "an optical axis direction".

The fourth lens unit L4 is moved in the optical axis direction to perform focusing. The first, second and third lens units L1, L2 and L3 are moved in the optical axis direction to perform variation of magnification. The lens barrel is provided with a mount 1 for attaching the lens barrel to a camera body (not illustrated). The lens barrel includes a first base barrel 2 serving as a base of the lens barrel, a guide barrel 3 which is a second base barrel and fixed to the first base barrel 2 in the optical axis direction and in a circumferential direction about the optical axis, and a cam barrel 4 which is a rotatable barrel and disposed at an inner circumference of the guide barrel 3. In the guide barrel 3, straight groove portions 3a, 3b and 3c (the last one of which is not illustrated) are formed which respectively guide the first to third lens units L1 to L3 in the optical axis direction. The straight groove portions 3a, 3b and 3c are each formed at three phases in the guide barrel 3 at equal intervals in the circumferential direction about the optical axis (that is, nine phases in total).

The cam barrel 4 is held by the guide barrel 3 and a bayonet mechanism (not illustrated) rotatably with respect to the guide barrel 3 in the circumferential direction and so as not to be movable in the optical axis direction. In the cam barrel 4, cam groove portions 4a, 4b, 4c and 4d (the last three of which are not illustrated) are formed to move the first, second, third and fourth lens units L1, L2, L3 and L4 in the optical axis direction. The cam groove portions 4a, 4b, 4c and 4d are each formed at three phases in the cam barrel 4 at equal intervals in the circumferential direction (that is, 12 phases in total). The cam groove portion 4a is formed as a groove having a bottom 4a-1.

At an outer circumference of the guide barrel 3, a linearly movable barrel 5 that holds the first lens unit L1 is disposed. To the linearly movable barrel 5, collars (collar members or cam followers) 6 as first guide members are attached. Each of the collars 6 engages with each of the straight groove portions 3a of the guide barrel 3 and each of the cam groove portions 4a of the cam barrel 4. In addition, to the linearly movable barrel 5, at positions in line with the respective collars 6 (that is, positions close to or adjacent to the collars 6) in the optical axis direction, collars (collar members or cam followers) 7, as second guide members, each constituting a pair with each collar 6 are attached. Each of the collars 7 engages with each of the straight groove portions 3a of the guide barrel 3. With this configuration, the linearly movable barrel 5 is held by the guide barrel 3 movably in the optical axis direction, but non-rotatably in the circumferential direction. As just described, at each of three phases in the guide barrel 3 at equal intervals in the circumferential direction, the paired collars 6 and 7 are attached.

Furthermore, at an inner circumference of the cam barrel 4, the second and third lens units L2 and L3 are disposed. Collars provided to the lens-holding frame of the second lens unit L2 respectively engage with the straight groove portions 3b of the guide barrel 3 and the cam groove portions 4b of the cam barrel 4. Collars provided to the lens-holding frame of the third lens unit L3 respectively engage with the straight groove portions 3c of the guide barrel 3 and the cam groove portions 4c of the cam barrel 4. With this configuration, the second and third lens units L2 and L3 are held by the guide barrel 3 movably in the optical axis direction, but non-rotatably in the circumferential direction.

Reference numeral 8 denotes a focus drive barrel. In the focus drive barrel 8, at three phases at equal intervals in its circumferential direction, drive groove portions extending in the optical axis direction are formed. Reference numeral 13 denotes a focus motor unit. The focus motor unit 13 includes an output key (not illustrated) engaging with part of the focus drive barrel 8. Collars provided to the lens-holding frame of the fourth lens unit L4 respectively engage with the drive groove portions of the focus drive barrel 8 and the cam groove portions 4d of the cam barrel 4. With this configuration, when the focus drive barrel 8 is rotated in the circumferential direction by the focus motor unit 13, the fourth lens unit L4 is moved in the optical axis direction by a lift of the cam groove portion 4d while being rotated in the circumferential direction by the drive groove portions of the focus drive barrel 8.

Reference numeral 9 denotes a zoom operation ring. The zoom operation ring 9 is attached to the outer circumference of the guide barrel 3 rotatably with respect to the guide barrel 3 in the circumferential direction. The zoom operation ring 9 has bayonet claws 9c bayonet-coupled to a circumferential groove portion 3d formed in the guide barrel 3. Consequently, the zoom operation ring 9 is held while being prevented from moving in the optical axis direction and allowed to rotate by a predetermined rotation amount in the circumferential direction with respect to the guide barrel 3.

Figure 4A:
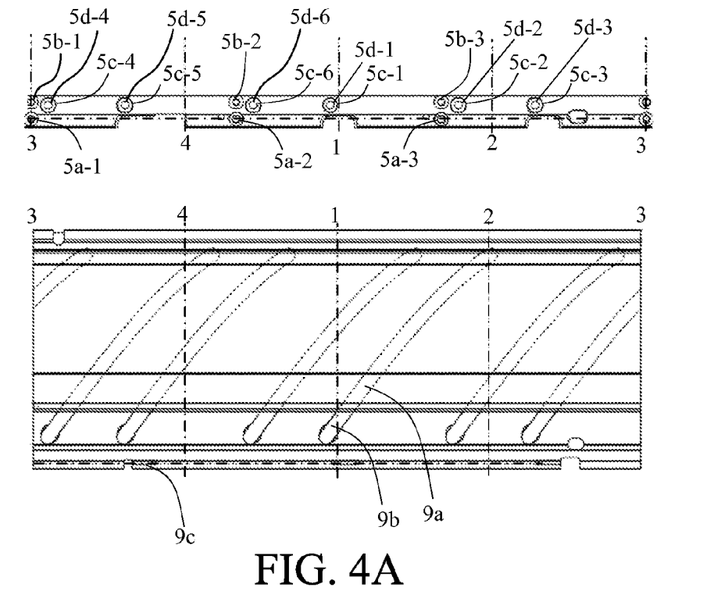
FIG. 4A is a development view of a linearly movable barrel and a zoom ring in the lens barrel of the embodiment.

FIG. 4A illustrates the zoom operation ring 9 developed in the circumferential direction. In an inner circumferential surface of the zoom operation ring 9, at six phases in its circumferential direction, six cam groove portions 9a are formed. The cam groove portions 9a are respectively engaged with six collars 10 illustrated in FIG. 5 and provided on an outer circumferential surface of the linearly movable barrel 5. With this configuration, rotation of the zoom operation ring 9 moves the linearly movable barrel 5 in the optical axis direction without rotating the linearly movable barrel 5 in the circumferential direction and rotates the cam barrel 4 in the circumferential direction. As illustrated in FIG. 4A, only at a rear end portion (an end portion on an image side) of the cam groove portion 9a, a through-opening portion 9b is formed.

With the above-described configuration, a user's rotation operation of the zoom operation ring 9 moves the first to third lens units L1 to L3 in the optical axis direction to perform the variation of magnification. Similarly, drive of the focus motor unit 13 moves the fourth lens unit L4 in the optical axis direction while rotating the fourth lens unit L4 in the circumferential direction to perform the focusing.

Figure 3:
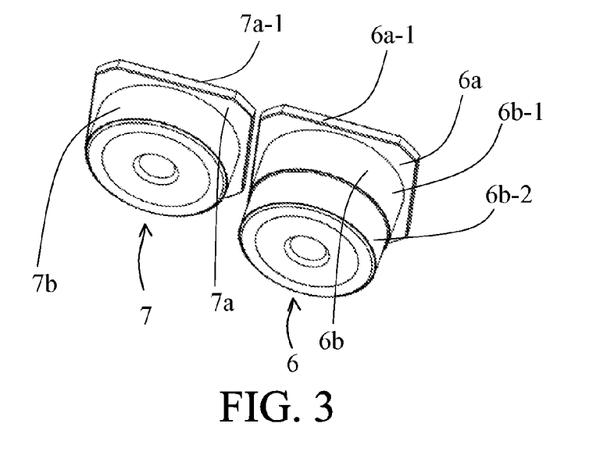
FIG. 3 illustrates collars used for the lens barrel of the embodiment.

Next, description will be made of configurations of the three paired collars 6 and 7 provided to the linearly movable barrel 5 and of an attachment structure for attaching the collars 6 and 7 to the linearly movable barrel 5. As illustrated in FIGS. 2 and 3, the collar 6 is constituted by a metal base portion 6a and a plastic cylindrical portion 6b disposed at an outer circumference of a cylindrical portion of the metal base portion 6a. The collar 6 is attached to the linearly movable barrel 5 as follows. A flange portions 6a-1 of the metal base portion 6a is made contact to a seat formed in the linearly movable barrel 5. A screw (fastening member) 11 is inserted into a hole portion 5a formed at a center of the seat of the linearly movable barrel 5 from an opposite side to the seat and is screwed into a female screw formed in an inner circumference of the metal base portion 6a. The screw 11 includes a shank portion 11a and a screw portion 11b. The shank portion 11a is inserted into the hole portion 5a of the linearly movable barrel 5. The shank portion 11a of the screw 11 is fitted to an inner circumferential surface of the metal base portion 6a of the collar 6.

The collar 7 is also constituted by a metal base portion 7a and a plastic cylindrical portion 7b disposed at an outer circumference of a cylindrical portion of the metal base portion 7a. The collar 7 is also attached to the linearly movable barrel 5 as follows. A flange portions 7a-1 of the metal base portion 7a is made contact to a seat of the linearly movable barrel 5. A screw 12 is inserted into a hole portion 5b formed at a center of the seat of the linearly movable barrel 5 from the opposite side to the seat and is screwed into a female screw formed in an inner circumference of the metal base portion 7a. The screw 12 also includes a shank portion 12a and a screw portion 12b. The shank portion 12a is inserted into the hole portion 5b of the linearly movable barrel 5. The shank portion 12a of the screw 12 is fitted to an inner circumferential surface of the metal base portion 7a of the collar 7.

As illustrated in FIG. 2, in the plastic cylindrical portions 6b of the collar 6, a first diameter portion 6b-1 close to the flange portion 6a-1 of the metal base portion 6a engages with the straight groove portion 3a of the guide barrel 3, and a second diameter portion 6b-2 far from the flange portion 6a-1 engages with the cam groove portion 4a of the cam barrel 4. An outer diameter of the second diameter portion 6b-2 is set to be slightly smaller than an outer diameter of the first diameter portion 6b-1. The plastic cylindrical portion 7b of the collar 7 engages with the straight groove portion 3a of the guide barrel 3.

Figure 4B:
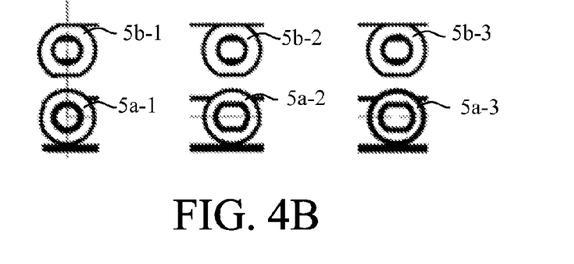
FIG. 4B is an enlarged view of hole portions in FIG. 4A.

As illustrated in FIG. 4A that is a development view in the circumferential direction, as the hole portion 5a of the linearly movable barrel 5, hole portions 5a-1 (first hole portion), 5a-2 and 5a-3 (a plurality of the second hole portions) located at three phases in the circumferential direction are formed. Into the hole portion 5a-1, the shank portion 11a of the screw 11 is inserted for attaching the collar 6 to the linearly movable barrel 5; the collar 6 is disposed at a first phase of the above-described three phases where the three paired collars 6 and 7 are arranged. As illustrated in FIG. 4B, the hole portion 5a-1 is formed as a circular hole portion whose inner diameter is equal or approximately equal to an outer diameter of the shank portion 11a of the screw 11 such that these diameters have a relation in which the hole portion 5a-1 and the shank portion 11a are in a fitted state or a slightly press-fitted state. With this shape of the hole portion 5a-1, the fitting (or slight press-fitting) of the shank portion 11a of the screw 11 inserted into the hole portion 5a-1 prevents the collar disposed at the first phase from displacing with respect to the linearly movable barrel 5 in the optical axis direction and the circumferential direction, which positions the collar 6 with respect to the linearly movable barrel 5 in these directions.

On the other hand, into the hole portions 5a-2 and 5a-3, the shank portions 11a of the screws 11 are inserted for attaching the collars 6 to the linearly movable barrel 5; these collars 6 are disposed at two second phases other than the first phase of the three phases where the three paired collars 6 and 7 are arranged. As illustrated in FIG. 4B, each of the hole portions 5a-2 and 5a-3 is formed as an elongated hole portion whose width in the optical axis direction is equal or approximately equal to the outer diameter of the shank portion 11a of the screw 11 such that these diameters have a relation in which each hole portion (5a-2 or 5a-3) and the shank portion 11a are in a fitted state or a slightly press-fitted state and whose width in the circumferential direction is longer than the outer diameter of the shank portion 11a. With such an attachment structure (first attachment structure), the insertion of the shank portion 11a of the screw 11 into each of the hole portions 5a-2 and 5a-3 positions the collar 6 disposed at the second phase in the optical axis direction with respect to the linearly movable barrel 5. On the other hand, before the fastening of the screw 11, a displacement of the collar in the circumferential direction is allowed, which enables position adjustment of the collar 6 in the circumferential direction.

As the hole portion 5b of the linearly movable barrel 5, hole portions 5b-1, 5b-2 and 5b-3 (a plurality of third hole portions) located at three phases in the circumferential direction are formed. Into the hole portions 5b-1, 5b-2 and 5b-3, the shank portions 12a of the screws 12 are inserted for attaching the collars 7 to the linearly movable barrel 5; the collars 7 are disposed at the three phases where the three paired collars 6 and 7 are arranged.

As illustrated in FIG. 4B, each of the hole portions 5b-1, 5b-2 and 5b-3 is formed as an elongated hole portion whose width in the optical axis direction is equal or approximately equal to the outer diameter of the shank portion 12a of the screw 12 such that these diameters have a relation in which each hole portion (5b-1, 5b-2 or 5b-3) and the shank portion 12a are in a fitted state or a slightly press-fitted state and whose width in the circumferential direction is longer than the outer diameter of the shank portion 12a. W With such an attachment structure (second attachment structure), the insertion of the shank portion 12a of the screw 12 into each of the hole portions 5b-1, 5b-2 and 5b-3 positions the collar 7 disposed at the three phases in the optical axis direction with respect to the linearly movable barrel 5. On the other hand, before the fastening of the screw 12, a displacement of the collar 7 in the circumferential direction is allowed, which enables position adjustment of the collar 7 in the direction circumferential.

Employing such attachment structures allowing the position adjustment in the circumferential direction enables absorbing manufacturing errors of components of the lens barrel such as the collars 6 and 7, the linearly movable barrel 5, the guide barrel 3 and the cam barrel 4 within the width in the circumferential direction of the hole portions 5a-2, 5a-3 and 5b-1 to 5b-3. This absorption of the manufacturing errors enables preventing generation of twisting between the collars 6 and 7 and the straight and cam groove portions 3a and 4a engaged therewith, which allows a smooth operation of the lens barrel.

As illustrated in FIG. 4A, at six locations in the linearly movable barrel 5 in the circumferential direction, concave portions 5c-1, 5c-2, 5c-3, 5c-4, 5c-5 and 5c-6 to receive the collars 10 are formed. The concave portion 5c-1 is formed as a circular concave portion whose inner diameter is equal to an outer diameter of the collar 10 such that these diameters have a relation in which the concave portion 5c-1 and the collar 10 are in a fitted state. On the other hand, each of the concave portions 5c-2, 5c-3, 5c-4, 5c-5 and 5c-6 is formed as an elongated-circular-shaped concave portion whose width in the optical axis direction is equal to the outer diameter of the collar 10 such that these diameters have a relation in which each concave portion and the collar 10 are in a fitted state and whose width in the circumferential direction is longer than the outer diameter of the collar 10. With this configuration, placing the collar 10 in the concave portion 5c-1 positions the collar 10 in the optical axis direction and the circumferential direction with respect to the linearly movable barrel 5. In contrast, placing the collars 10 in the concave portions 5c-2, 5c-3, 5c-4, 5c-5 and 5c-6 positions these collars 10 in the optical axis direction with respect to the linearly movable barrel 5 and enables position adjustment of these collars 10 in the circumferential direction with respect thereto.

Accordingly, even when the collars 10, the linearly movable barrel 5, the zoom operation ring 9 and the other components have a predetermined manufacturing error amount, the error amount can be absorbed within the width in the circumferential direction of the concave portions 5c-2, 5c-3, 5c-4, 5c-5 and 5c-6. Thus, this embodiment can prevent generation of twisting between the collars 10 and the cam groove portions 9a engaged therewith, which enables a smooth operation of the lens barrel.

Figure 5:
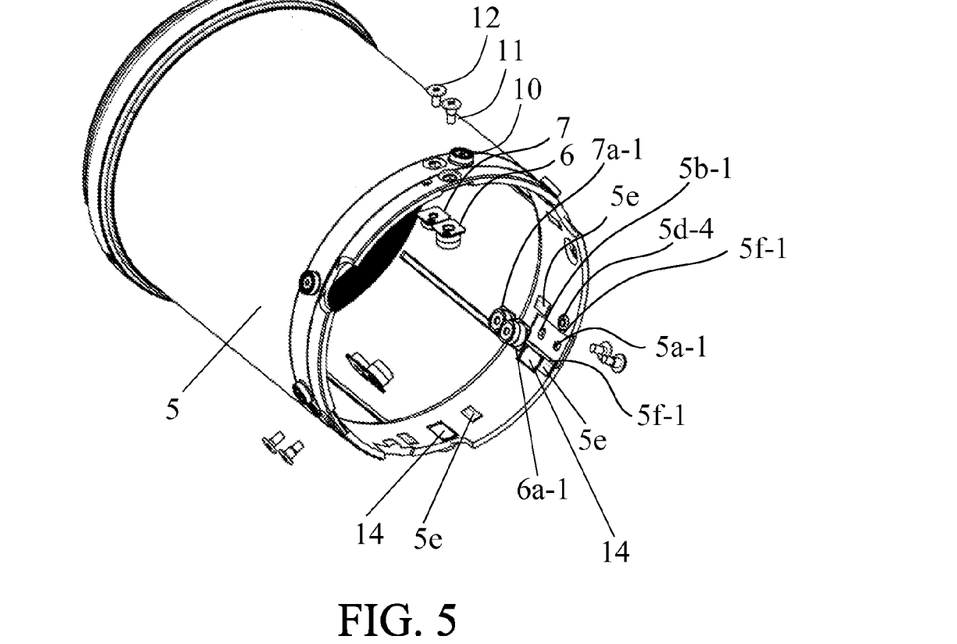
FIG. 5 is an exploded perspective view illustrating a relation between the linearly movable barrel and the collars in the embodiment.
Figure 6:
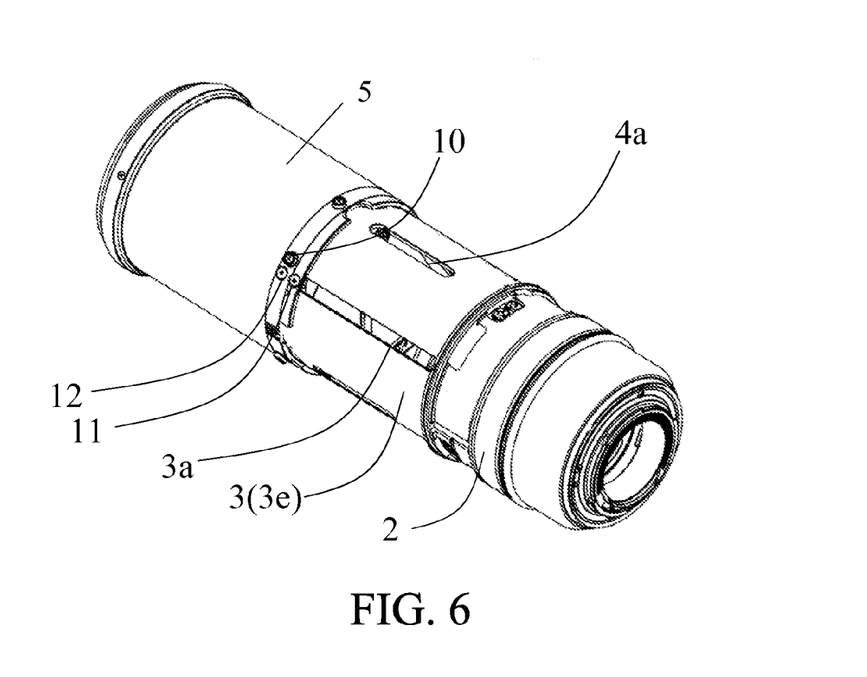
FIG. 6 is a perspective view illustrating the lens barrel of the embodiment that is in process of assembling.
Figure 7:
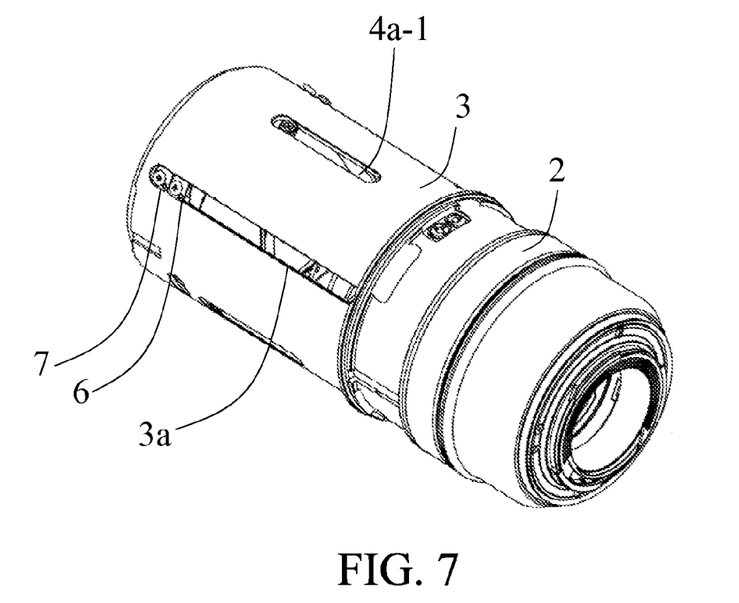
FIG. 7 is a perspective view illustrating main components of the lens barrel of the embodiment.
Figure 8:
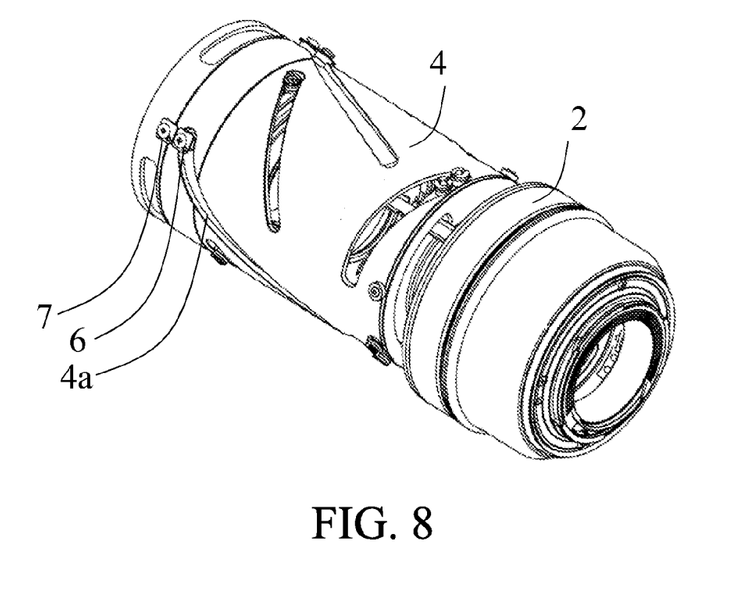
FIG. 8 is another perspective view illustrating the main components.

FIG. 5 illustrates the collars 6, 7 and 10 which are being assembled to the linearly movable barrel 5. FIG. 6 illustrates the linearly movable barrel 5 which has been assembled to the guide barrel 3. FIG. 7 illustrates a configuration in which only the linearly movable barrel 5 is omitted from that illustrated in FIG. 6. FIG. 8 illustrates a configuration in which the guide barrel 3 is omitted from that illustrated in FIG. 7.

As illustrated in FIG. 7, before the assembling of the linearly movable barrel 5 to the guide barrel 3, the collars 6 and 7 are set at all of the three phases. The term "set" referred to herein means to insert each collar 6 into an intersection of the straight groove portion 3a and the cam groove portion 4a and to insert each collar 7 into the straight groove portion 3a. As illustrated in FIG. 2, the cam groove portion 4a is formed to have the bottom 4a-1 on an inner circumference side of the cam barrel 4. The collar 6 makes contact to the bottom 4a-1 when inserted deep into the cam groove portions 4a and is thereby prevented from falling inside the cam barrel 4. On the other hand, although the collar 7 is inserted into the straight groove portion 3a at which the cam groove portion 4a is not formed, the collar 7 makes contact to an outer surface 4e-1 of the cam barrel 4 when inserted deep into the straight groove portion 3a and is thereby prevented from falling inside the cam barrel 4.

In this configuration, it is desirable that the plastic cylindrical portion 6b of the collar 6 have an outer diameter slightly larger than the widths of the cam groove portion 4a and the straight groove portion 3a and that the plastic cylindrical portion 7b of the collar 7 have an outer diameter slightly larger than the width of the straight groove portion 3a. This setting of the diameters contributes to an improvement in a holding accuracy of the optical system and provides an effect of easing temporary holding of the collars 6 and 7 even during the assembling.

After the collars 6 and 7 are set at the three phases as illustrated in FIG. 7, the linearly movable barrel 5 is assembled to the guide barrel 3 from its front side (object side), and is positioned with respect to the guide barrel 5 such that the collars 6 can be fixed by the screws 11.

Thereafter, the collar 6 located at the hole portion 5a-1 of the linearly movable barrel 5 are fixed by the screw 11. Next, the collars 6 located at the hole portions 5a-2 and 5a-3 are fixed by the screws 11. Then, the collars 7 located at the hole portions 5b-1, 5b-2 and 5b-3 are fixed by the screws 12.

In the attachment of the collars 6 and 7 to the linearly movable barrel 5, it is important to hold the linearly movable barrel 5 and the guide barrel 3 such that a cylinder center axis of the linearly movable barrel 5 and that of the guide barrel 3 coincide with each other. As a method of making the cylinder center axis of the linearly movable barrel 5 and that of the guide barrel 3 coincide with each other, a method may be employed which holds these barrels 5 and 3 by using a tool fabricated with good accuracy, at positions at which their cylinder center axes coincide with each other. Alternatively, a method may be employed which sets diameters of the linearly movable barrel 5 and the guide barrel 3 such that these barrels 5 and 3 are fitted to each other. In FIG. 5, at multiple circumferential locations on an inner circumferential surface of the linearly movable barrel 5, fitting protrusions 5e are formed, and an outer circumferential surface 3e of the guide barrel 3 is fitted to the fitting protrusions 5e. With the above-described assembling, the screw-fixing of the collar 6 to the hole portion 5a-1 positions the linearly movable barrel 5 in a rotation direction about the cylinder center axis (that is, in the circumferential direction) and in the optical axis direction, with respect to the guide barrel 3. Then, the collars 6 and 7 are screw-fixed to the hole portions 5a-2, 5a-3, 5b-1, 5b-2 and 5b-3, and thereby the guide barrel 3 and the linearly movable barrel 5 are held in a state where their cylinder center axes coincide with each other. The hole portions 5a-2 and 5a-3 each have an elongated hole shape extending in the circumferential direction. Therefore, even when the three straight groove portions 3a and the three cam groove portions 4a have manufacturing errors, the collars 6 are fixed at all of the three phases at the intersections of the straight groove portions 3a and the cam groove portions 4a.

Thereafter, the collars 7 are screw-fixed to the hole portions 5b-1, 5b-2 and 5b-3. The hole portions 5b-1, 5b-2 and 5b-3 also each have an elongated hole shape extending in the circumferential direction. Therefore, even when the three straight groove portions 3a have the manufacturing errors, the collars 7 can be fixed at positions according to the manufacturing errors.

The collar 6 may be rotated with the screw 11 rotated to screw-fix the collar 6 with respect to the linearly movable barrel 5. However, as illustrated in FIGS. 3 and 5, the flange portion 6a-1 of the collar 6 has a rectangular shape, so that contact of the flange portion 6a-1 to inner faces 5f-1 to 5f-3 (5f-2 and 5f-2 are not illustrated) surrounding the seat formed in the linearly movable barrel 5 prevents the rotation of the collar 6.

Similarly, the collar 7 may be rotated with the screw 12 rotated to screw-fix the collar 7 with respect to the linearly movable barrel 5. However, as illustrated in FIGS. 3 and 5, the flange portion 7a-1 of the collar 7 has a rectangular shape, so that contact of the flange portion 7a-1 to the inner faces 5f-1 to 5f-3 surrounding the seat formed in the linearly movable barrel 5 prevents the rotation of the collar 7.

The plastic cylindrical portions 6b and 7b of the collars 6 and 7 each have a cylindrical shape. For this reason, even when the collars 6 and 7 are rotated by the screw-fixing thereof together with the screws 11 and 12 and are thus rotated about the center axes of the plastic cylindrical portion 6b and 7b, a contact relation of the plastic cylindrical portions 6b and 7b with the straight groove portions 3a and the cam groove portions 4a does not change.

In this embodiment, the flange portions 6a-1 and 7a-1 of the collars 6 and 7 each has a symmetric shape so as to be identical in shape before and after its rotation by 90° about the center axis of the plastic cylindrical portion (6b or 7b). Such a shape of the flange portions 6a-1 and 7a-1 eliminates the need for taking into consideration a direction of the attachment of the collars 6 and 7 to the linearly movable barrel 5.

As described above, the collars 6 and 7 can be fixed to the linearly movable barrel 5 at appropriate positions at which no twisting is generated between the collars 6 and 7, the straight groove portion 3a and the cam groove portion 4a, which provides a lens barrel capable of being smoothly operated.

Figure 9A:
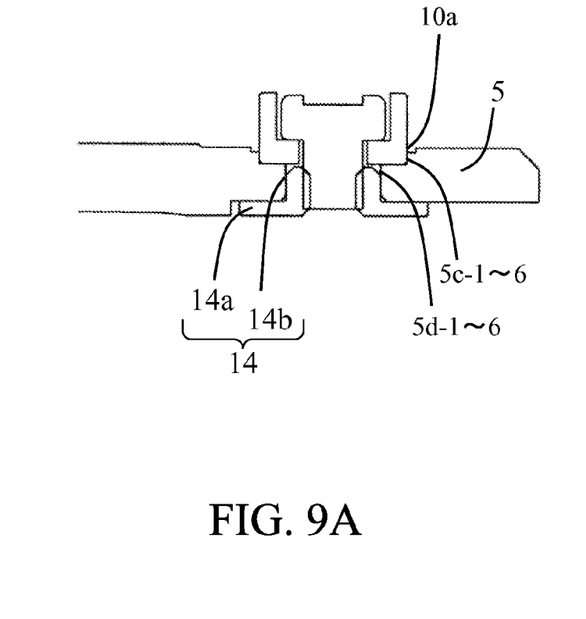
FIG. 9A is a sectional view illustrating a configuration of the collars in the embodiment.
Figure 9B:
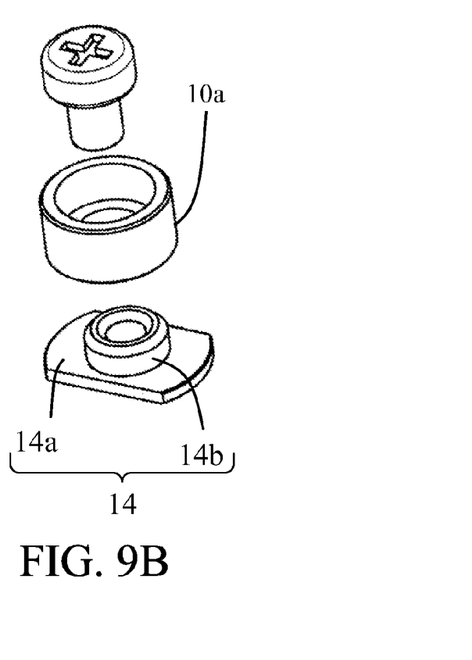
FIG. 9B is an exploded view illustrating a method of fixing the collars.

Next, description will be made of collars 10 to be attached to the linearly movable barrel 5 such that the collars 10 engage with the cam groove portions 9a of the zoom operation ring 9. The collars 10 are placed into the concave portion 5c-1 to 5c-6 of the linearly movable barrel 5 through the through-opening portion 9b formed in the zoom operation ring 9. In an inner circumferential surface of the linearly movable barrel 5, nuts 14 are press-fitted in advance as shown FIG. 5. As illustrated in FIGS. 9A and 9B, each of the nuts 14 includes a seat portion 14a and a boss portion 14b inside which a female screw is formed. The boss portions 14b of the nuts 14 are inserted into hole portions 5d-1 to 5d-6 formed at the same phases as those at which the concave portions 5c-1 to 5c-6 of the linearly movable barrel 5 are formed.

First, through the through-opening portion 9b of the zoom operation ring 9, the collar 10 is placed in the circular concave portion 5c-1 from an outer circumference side of the zoom operation ring 9 and then is screw-fixed to the nut 14. Next, the other collars 10 are placed in the circular concave portions 5c-2 to 5c-6 and then screw-fixed to the nuts 14.

Figures 10A, 10B:
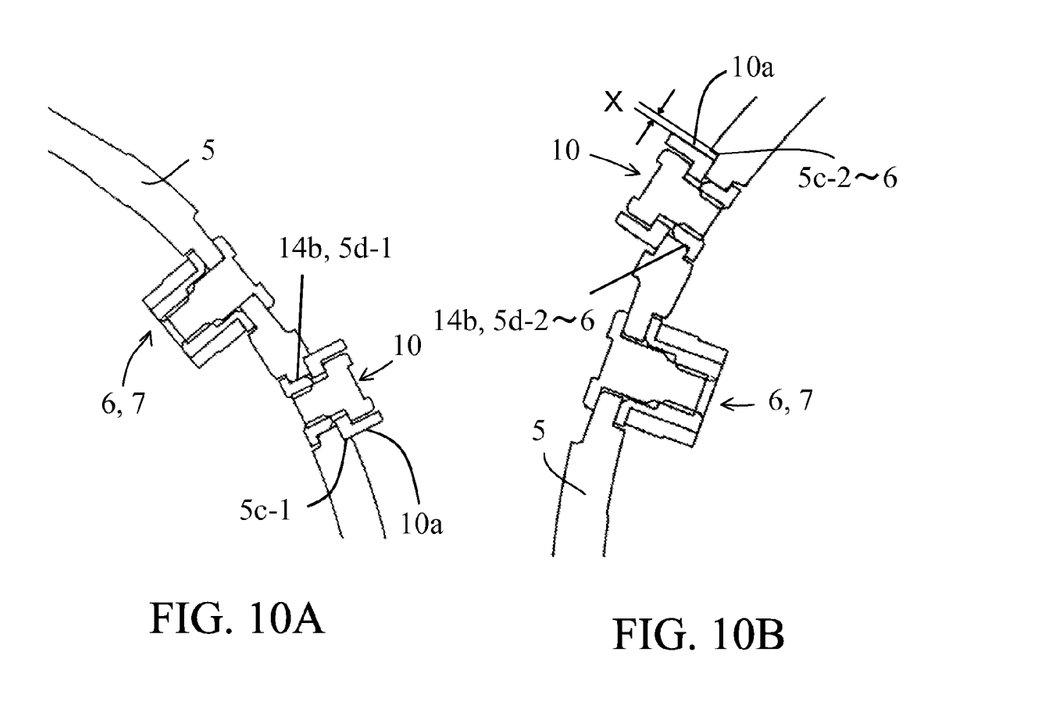
FIG. 10A is another sectional view illustrating the configuration of the collars in the embodiment.
FIG. 10B is another exploded view illustrating the method of fixing the collars in the embodiment.

FIGS. 9A and 10A illustrate the collar 10 attached to the concave portion 5c-1 of the linearly movable barrel 5. FIG. 10B illustrates the other collars 10 attached to the concave portions 5c-2 to 5c-6. FIG. 9A illustrates a section passing through and being parallel to the optical axis, and FIGS. 10A and 10B illustrate a section orthogonal to the optical axis.

As illustrated in FIG. 9A, outer circumferential portions 10a of the collars 10 are fitted into the concave portions 5c-1 to 5c-6 of the linearly movable barrel 5 in the optical axis direction, and thereby the collars 10 are positioned in the optical axis direction. As illustrated in FIG. 10A, the collar 10 fixed to the concave portion 5c-1 is fitted into the concave portion 5c-1 also in the circumferential direction, and thereby the collar 10 is positioned in the circumferential direction. As illustrated in FIG. 10B, the collars 10 fixed to the concave portions 5c-2 to 5c-6 have a position adjustment clearance X in the circumferential direction.

The zoom operation ring 9 is held coaxially with the guide barrel 3 by their fitting to each other. An axis tilt of the zoom operation ring 9 with respect to the guide barrel 3 depends on a positional relation between the bayonet claws 9c of the zoom operation ring and the circumferential groove portion 3b of the guide barrel 3. Furthermore, an axis tilt of the linearly movable barrel 5 with respect to the guide barrel 3 depends on an assembled state of the collars 6. For this reason, the axis tilts of the zoom ring 8 and the linearly movable barrel 5 are different among individual lens barrels depending on manufacturing accuracies and assembling accuracies of their components.

The above-described assembling is performed in the following order. First, the collar 10 is screw-fixed to the hole portion 5c-1, which fixes positional relations of the zoom operation ring 9 and the linearly movable barrel 5 in the circumferential direction and the optical axis direction. Then, the other collars 10 are screw-fixed to the concave portions 5c-2 to 5c-6, which connects the zoom operation ring 9 and the linearly movable barrel 5 to each other with a predetermined axis tilt between the zoom operation ring 9 and the linearly movable barrel 5 maintained.

As described above, in the assembling of the collars 10 to the linearly movable barrel 5, the collars 10 can be fixed, within a range of the clearance X, at appropriate positions at which no twisting is generated between the collars 10 and the cam groove portions 9a of the zoom operation ring 9. This configuration enables providing the lens barrel capable of being smoothly operated. Furthermore, this configuration also contributes to assembling of the lens barrel that enables making, in the variation of magnification, the axis tile of the linearly movable barrel 5 remain unchanged as much as possible.

Furthermore, as described above, each of the collars 6 including the first diameter portion 6b-1 engaging with the straight groove portion 3a of the guide barrel 3 and the second diameter portion 6b-2 engaging with the cam groove portion 4a of the cam barrel 4 integrally formed with each other is fixed to the linearly movable barrel 5. This configuration achieves less influence of the manufacturing errors of the components as compared to a case where collars to be respectively fitted into the straight groove portion 3a and the cam groove portion 4a are separately provided and fixed at separate positions. This reduction in the component manufacturing error enables increasing a holding accuracy of the optical system.

The collars 6 and 7 are formed in the cylindrical shape, which is less affected by their rotation together with the screws 11 and 12 in the screw-fixing. This configuration enables avoiding a problem that a collar formed in a rectangular key shape cannot be fixed in parallel to a groove portion, which may be caused by screw-fixing of the collar.

In a driving mechanism constituted by the collar 6 disposed at the intersection of the cam groove portion 4*a* having a non-linear shape and the straight groove portion 3*a* parallel to the optical axis, a contact point of the collar 6 which makes contact to the cam groove portion 4*a* changes with a relative movement between the collar 6 and the cam groove portion 4*a*, but another contact point thereof which makes contact to the straight groove portion 3*a* does not change. For this reason, employing a configuration in which the two (paired) collars 6 and 7 arranged in the optical axis direction engage with the straight groove portion 3*a* provides two contact points to the collars 6 and 7, which is more effective to reduce an abrasion of each of the collars 6 and 7 caused by repetition of magnification-varying operations.

Although this embodiment described the example in which the collars 6 and 7 engaging with the straight groove portion 3*a* are respectively formed by the metal base portions 6*a* and 7*a* and the plastic cylindrical portions 6*b* and 7*b*, the collars may be formed alternatively by only metal or plastic. Forming the collars by metal enables making these collars more reliable in terms of strength and abrasion resistance. The collars 6 and 7 are not required to be formed by mutually identical materials and may be formed by mutually different materials. In this case, a combination of the collars 6 and 7 is achieved which improves their strength and abrasion resistance as compared to a case where the collars are both formed by plastic, and which reduces an actuation sound and prevents actuation feel (operational feel) from being deteriorated as much as possible as compared to a case where the collars are both formed by metal. Moreover, the first diameter portion 6*b*-1 and the second diameter portion 6*b*-2 of the collar 6 may be formed by mutually different materials, or one of the first and second diameter portions 6*b*-1 and 6*b*-2 may be constituted by a bearing or the like. In this case, for example, a combination having a sufficient strength and a good operability can be achieved by forming one of the first and second diameter portions 6*b*-1 and 6*b*-2 that is more prone to being affected by an impact force by a material having a stiffness (strength) higher than that of the other and by forming the other less prone to be affected by the impact force by plastic. Moreover, using the bearing for one of the first and second diameter portions 6*b*-1 and 6*b*-2 achieves a configuration requiring a reduced operational force.

Although the above embodiment described the example in which the two collars 6 and 7 engaging with the straight groove portion are arranged in the optical axis direction, three or more collars may be arranged in the optical axis direction. The latter configuration can make the lens barrel more reliable in terms of strength and abrasion resistance. Furthermore, although this embodiment described the case where the collars 6 an 7 arranged in the optical axis direction are arranged at the three phases in the circumferential direction, it is only necessary to provide the collars at three or more phases in the circumferential direction. Also in this case, number of the first phase is one, and that of the second phases are two or more.

Moreover, although the above embodiment described the example in which both the straight groove portion 3*a* and the cam groove portion 4*a* each have a groove shape, a protrusion extending in the optical axis direction or a cam track direction (that is, as an elongated protrusion) may alternatively be used as a straight guide portion and a cam portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-188902, filed on Sep. 17, 2014, which is hereby incorporated by reference wherein in its entirety.

What is claimed is:

1. A lens barrel comprising:
a base barrel fixed in an optical axis direction and in a circumferential direction about an optical axis;
a movable barrel movable with respect to the base barrel in the optical axis direction, the movable barrel including a first hole portion and a plurality of second hole portions,
a rotatable barrel rotatable with respect to the base barrel and the movable barrel in the circumferential direction; and
a plurality of first guide members,
wherein:
the base barrel includes a plurality of straight guide portions extending in the optical axis direction to guide the movable barrel in the optical axis direction,
the rotatable barrel includes a plurality of cam portions to move the movable barrel in the optical axis direction with rotation of the rotatable barrel,
the first guide members engage with the cam portions and the straight guide portions,
the cam portions, the straight guide portions and the first guide members are respectively provided at multiple phases which are three or more phases in the circumferential direction,
a guide member out of the first guide members provided at a first phase of the multiple phases engages with the first hole portion,
each of other guide members out of the first guide members provided at two or more second phases of the multiple phases different from the first phase engages each of the second hole portions, and
a width of each of the second hole portions in the circumferential direction is larger than a width of the first hole portion in the circumferential direction in view of a direction perpendicular to the optical axis.

2. The lens barrel according to claim 1, wherein the first hole portion is configured so that a width in the circumferential direction is same as a width in the optical axis direction in view of a direction perpendicular to the optical axis.

3. The lens barrel according to claim 1, wherein a width in the optical axis direction of the first hole portion is same as a width in the optical axis direction of the each of the second hole portions.

4. The lens barrel according to claim 1, wherein each of the second hole portions is configured so that a width in the circumferential direction is larger than a width in the optical axis direction in view of a direction perpendicular to the optical axis.

5. The lens barrel according to claim 1, further comprising a plurality of second guide members engaging with the straight guide portion, the second guide members provided at the multiple phases,
   wherein each of the first guide members and each of the second guide members are arranged in the optical axis direction,
   each of the second guide members engages with each of a plurality of third hole portions, and
      a width of each of the third hole portions in the circumferential direction is larger than the width of the first hole portion in the circumferential direction in view of a direction perpendicular to the optical axis.

6. The lens barrel according to claim 1, wherein each of the third hole portions is configured so that a width in the circumferential direction is larger than a width in the optical axis direction in view of the direction perpendicular to the optical axis.

7. The lens barrel according to claim 5, wherein a material of one of the first and second guide members have a stiffness higher than that of a material of another of the first and second guide members.

8. An optical apparatus comprising:
   a lens; and
   a lens barrel holding the lens, wherein the lens barrel comprising:
   a base barrel fixed in an optical axis direction and in a circumferential direction about an optical axis;
   a movable barrel movable with respect to the base barrel in the optical axis direction, the movable barrel including a first hole portion and a plurality of second hole portions,
   a rotatable barrel rotatable with respect to the base barrel and the movable barrel in the circumferential direction; and
   a plurality of first guide members,
   wherein:
   the base barrel includes a plurality of straight guide portions extending in the optical axis direction to guide the movable barrel in the optical axis direction,
   the rotatable barrel includes a plurality of cam portions to move the movable barrel in the optical axis direction with rotation of the rotatable barrel,
   the first guide members engage with the cam portions and the straight guide portions,
   the cam portions, the straight guide portions and the first guide members are respectively provided at multiple phases which are three or more phases in the circumferential direction,
   a guide member out of the first guide members provided at a first phase of the multiple phases engages with the first hole portion,
   each of other guide members out of the first guide members provided at two or more second phases of the multiple phases different from the first phase engages each of the second hole portions, and
   a width of each of the second hole portions in the circumferential direction is larger than a width of the first hole portion in the circumferential direction in view of a direction perpendicular to the optical axis.

9. A method of manufacturing a lens barrel comprising a base barrel fixed in an optical axis direction and in a circumferential direction about an optical axis, a movable barrel movable with respect to the base barrel in the optical axis direction, a rotatable barrel rotatable with respect to the base barrel and the movable barrel in the circumferential direction, the method comprising the steps of:
   inserting each of a plurality of first guide members to each of a plurality of cam portions provided at a multiple phases and included the rotatable barrel, and to each of a plurality of straight guide portions provided at the multiple phases and included the base barrel,
   positioning a guide member out of the first guide members provided at a first phase of the multiple phases with respect to the movable barrel in the optical axis direction and in the circumferential direction by a first hole portion,
   positioning other guide members out of the first guide members provided at two or more second phase of the multiple phases different from the first phase with respect to the movable barrel in the optical axis direction by a plurality of second hole portions configured so that a width in the circumferential direction is larger than a width in the optical axis direction in view of a direction perpendicular to the optical axis.

10. The method of manufacturing a lens barrel according to claim 9, further comprising the steps of:
   inserting each of a plurality of second guide members to each of the straight guide portions,
   positioning each of the second guide members with respect to the movable barrel in the optical axis direction by a plurality of third hole portions configured so that a width in the circumferential direction is larger than a width in the optical axis direction in view of the direction perpendicular to the optical axis.

* * * * *